United States Patent
Stauber et al.

(10) Patent No.: US 11,989,571 B2
(45) Date of Patent: *May 21, 2024

(54) GENERATING USER INTERFACE CONTAINERS

(71) Applicant: Microsoft Technology Licensing, LLC, Redmond, WA (US)

(72) Inventors: William Scott Stauber, Seattle, WA (US); Ramrajprabu Balasubramanian, Sammamish, WA (US); Nathan T. Radebaugh, Wheaton, IL (US); Kenton A Shipley, Woodinville, WA (US); Patrick J. Derks, Seattle, WA (US); Paul Dykstra, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,201

(22) Filed: Apr. 14, 2022

(65) Prior Publication Data

US 2022/0382566 A1    Dec. 1, 2022

Related U.S. Application Data

(63) Continuation of application No. 16/613,617, filed as application No. PCT/US2017/038027 on Jun. 16, 2017, now Pat. No. 11,321,103.

(51) Int. Cl.
*G06F 9/451* (2018.01)

(52) U.S. Cl.
CPC .................. *G06F 9/451* (2018.02)

(58) Field of Classification Search
CPC .............. G06F 9/451; G06F 3/0481
See application file for complete search history.

(56) References Cited

U.S. PATENT DOCUMENTS

| | | | |
|---|---|---|---|
| 2005/0088452 A1* | 4/2005 | Hanggie | G06F 9/451 345/581 |
| 2006/0168388 A1* | 7/2006 | von Tetzchner | H04L 67/34 710/305 |
| 2007/0061495 A1 | 3/2007 | Cummins et al. | |
| 2007/0180362 A1* | 8/2007 | Hunt | G06F 9/451 715/210 |
| 2008/0034314 A1* | 2/2008 | Louch | G06F 3/0481 715/764 |
| 2010/0235789 A1* | 9/2010 | Liang | G06F 21/31 726/19 |

(Continued)

OTHER PUBLICATIONS

"Notice of Allowance Issued in European Patent Application No. 17734910.7", dated Mar. 24, 2023, 7 Pages.

(Continued)

*Primary Examiner* — Phenuel S Salomon

(57) ABSTRACT

A system for generating a user interface described herein can include a processor to detect a plurality of display characteristics from a user interface manager, wherein the plurality of display characteristics correspond to a type of a device. The processor can also detect a list of applications being executed by the system and generate a user interface container by applying the plurality of display characteristics to each of the applications from the list of applications.

17 Claims, 4 Drawing Sheets

(56) References Cited

U.S. PATENT DOCUMENTS

2010/0318770 A1* 12/2010 Lin ..................... G06F 9/451
                                                    715/769
2011/0161843 A1*  6/2011 Bennett ............... H04N 21/235
                                                    715/760
2011/0265188 A1* 10/2011 Ramaswamy .......... G06F 21/31
                                                    715/764
2018/0260083 A1*  9/2018 Glickman ............. G06F 3/038

OTHER PUBLICATIONS

"First Office Action and Search Report Issued in Chinese Patent Application No. 201780092112.6", dated Mar. 29, 2023, 9 Pages.
"Office Action Issued in Indian Patent Application No. 201947052210", dated Mar. 17, 2022, 5 Pages.
"Decision To Grant Issued in European Patent Application No. 17734910.7", dated Jun. 22, 2023, 2 Pages.
Notice of Granting Patent Right Received in Chinese Patent Application No. 201780092112.6, mailed on Feb. 21, 2024, 4 pages.

* cited by examiner

300

GENERATING USER INTERFACE CONTAINERS

CROSS-REFERENCE TO RELATED APPLICATIONS

This application is a Continuation of U.S. patent application Ser. No. 16/613,617 filed Nov. 14, 2019, which is a National Stage of International Application No. PCT/2017/038027 filed Jun. 16, 2017, and which applications are incorporated herein by reference in their entireties. To the extent appropriate, a claim of priority is made to each of the above disclosed applications.

BACKGROUND

Desktop computers provide a user interface that enables users to view and interact with various applications. Since the introduction of mobile devices, users can also view and interact with applications on augmented reality devices, mobile devices, tablet devices, and gaming consoles, among others. Each device can separately generate a user interface based on fixed application functions. For example, each device can separately generate a user interface by hard coding or using a fixed format for displaying applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for generating user interface containers that includes a processor to detect a plurality of display characteristics from a user interface manager, wherein the plurality of display characteristics correspond to a type of a device. The processor can also detect a list of applications being executed by the system and generate a user interface container by applying the plurality of display characteristics to each of the applications from the list of applications.

In another embodiment described herein, a method for generating user interface containers can include detecting a plurality of display characteristics from a user interface manager, wherein the plurality of display characteristics correspond to a type of a device. The method can also include detecting a list of applications being executed by the system. Furthermore, the method can include generating a user interface container by applying the plurality of display characteristics to each of the applications from the list of applications.

In yet another embodiment described herein, one or more computer-readable storage devices for generating user interface containers can include a plurality of instructions that, based at least on execution by a processor, cause the processor to detect a plurality of display characteristics from a user interface manager, wherein the plurality of display characteristics correspond to a type of a device. The plurality of instructions can also cause the processor to detect a list of applications being executed by the system and generate a user interface container by applying the plurality of display characteristics to each of the applications from the list of applications.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
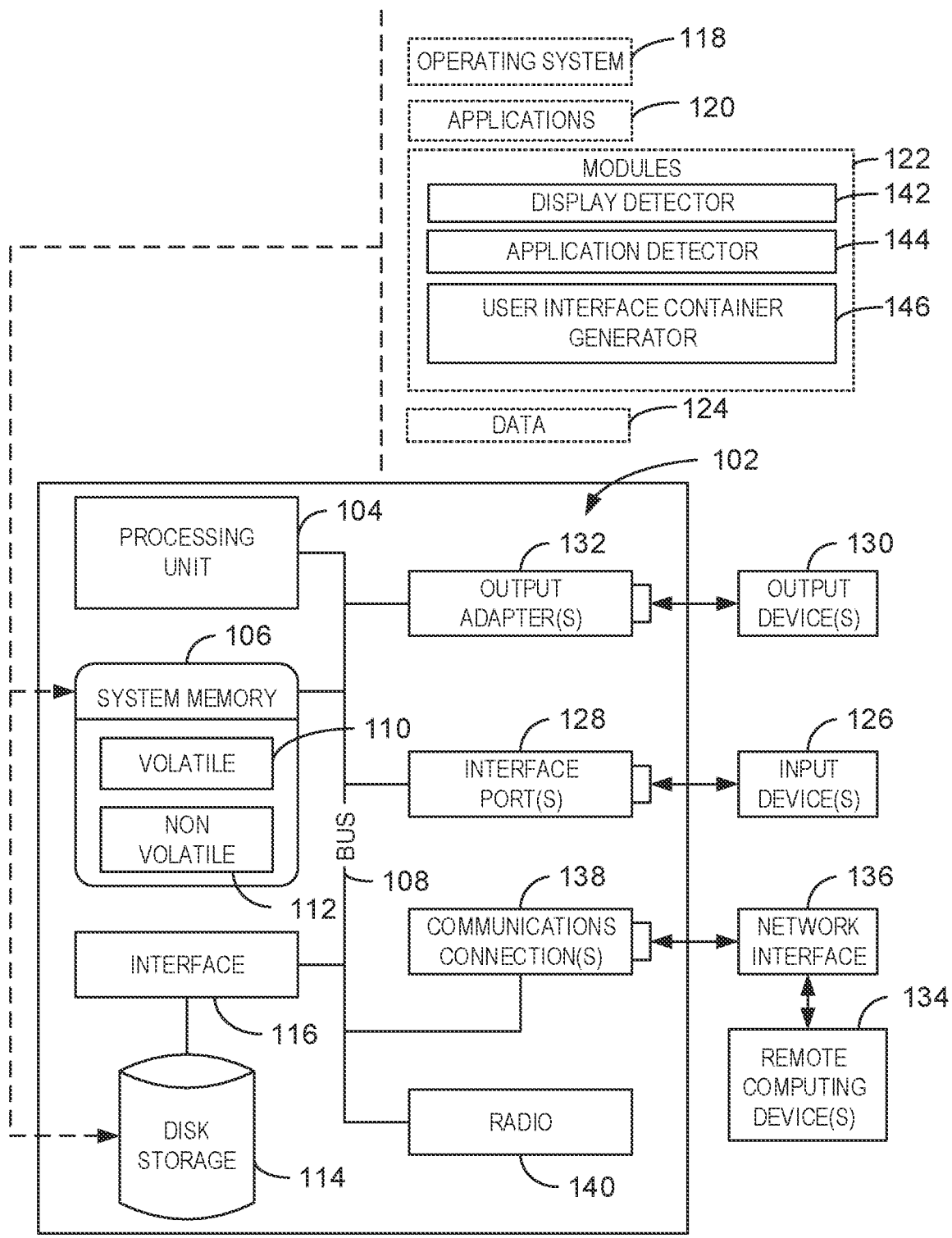
FIG. 1 is a block diagram of an example of a computing system that can generate a user interface container.

User interfaces can be generated using various static, non-reusable techniques. For example, user interfaces for different devices can be generated using different sets of functions, different data paths, and different visual compositions. Accordingly, applications can include different code to generate a user interface for each type of device. The applications can also have deep context about the device on which they are running and map user interface controls directly to pixel coordinates on a display device. For example, the applications may specify pixel coordinates to display a user control element such as a text field, among others.

Techniques described herein provide a system for generating a user interface container that is re-usable by various user interface managers. A user interface container, as referred to herein, can include display characteristics, such as layout rules, among others, indicating how to generate a user interface for a particular type of device. In some embodiments, a system for generating the user interface containers can include detecting a plurality of display characteristics from a user interface manager, wherein the plurality of display characteristics correspond to a type of a device. For example, the plurality of display characteristics can indicate whether windows can be overlapped, whether a full screen mode is supported, window frame properties, and the like. Additionally, a system can detect a list of applications being executed by the system. Furthermore, the system can generate a user interface container by applying the plurality of display characteristics to each of the applications from the list of applications. Accordingly, the user interface container can indicate, for each application being executed, the frame and adornments around the window such as a close control feature, a maximize control feature, a resize control feature, and the like. Additionally, the user interface container can provide layout rules for sizing and arranging the application windows within the user interface container. For example, a desktop user interface or shell may configure the layout to be overlapped windows or a tablet user interface or shell may configure the arrangement to be one application at a time. In some examples, the display characteristics can correspond to a particular type of device. For example, the display characteristics for a desktop computing device can differ from the display characteristics for a mobile device, tablet device, augmented reality device, or gaming console device.

The techniques described herein enable code for generating user interface containers to be shared for any number of different devices. For example, the techniques described herein can enable generation of shared code that can be used when generating a user interface container for a desktop device, a tablet device, a mobile device, a phone device, a gaming console device, and an augmented reality device, among others. The shared code can be incorporated by different user interface containers based on display characteristics corresponding to each type of device. For example, code for displaying a user application with certain display characteristics can be shared between any number of different user interface managers corresponding to different types of devices.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can generate a user interface container. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a display detector 142, an application detector 144, and a user interface container generator 146. In some embodiments, the display detector 142 can detect a plurality of display characteristics from a user interface manager, wherein the plurality of display characteristics correspond to a type of a device. A user interface manager, as referred to herein, can include any suitable application that can generate a visual appearance for applications being executed on a particular type of device. For example, a user interface manager can generate a two dimensional or three dimensional image indicating the various user applications that are visible. In some embodiments, the application detector 144 can detect a list of applications being executed by the system. The list of applications can indicate a number of application windows that may be visible in a user interface. In some embodiments, the user interface container generator 146 can generate a user interface container by applying the plurality of display characteristics to each of the applications from the list of applications. The plurality of display characteristics can indicate a layout of a user interface, which can include a two dimensional representation of visible applications and system controls. The display characteristics can include whether application windows can be overlapped, whether applications can be visible in a full screen mode, or a location on a display screen corresponding to various operating system menus and functions, among others. The display characteristics can also indicate preferences for window chrome or user application windows. For example, the display characteristics can indicate a type of frame to include with an application displayed in the user interface, and a title bar to include with the application, among others.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the display detector 142, application detector 144, and user interface container generator 146 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
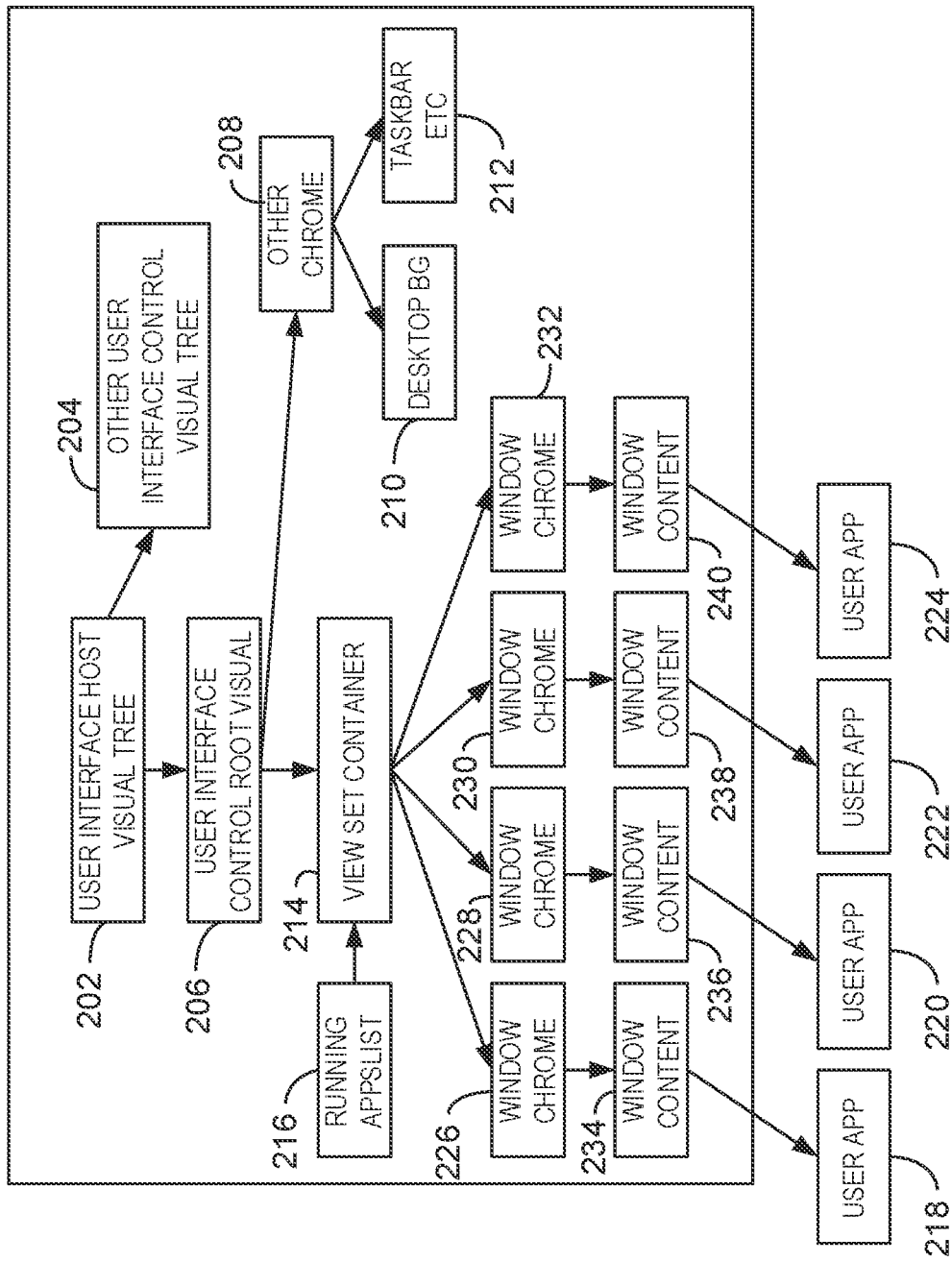
FIG. 2 is a block diagram of an example user interface manager that can generate a user interface container.

FIG. 2 is a block diagram of a user interface manager that can generate a user interface container. The user interface manager 200 can be executed with any suitable number of applications and software components. For example, the user interface manager 200 can include a user interface host visual tree (also referred to as a user interface host) 202 that can include any number of user interface controls for different types of devices 204 such as gaming console devices, table devices, mobile devices, phone devices, and augmented reality devices, among others. In some embodiments, the user interface host visual tree 202 can include a user interface control root visual 206 that can include Windows.UI.Composition and root Extensible Application Markup Language (XAML) code to declaratively or imperatively generate various elements of a user interface or shell. The user interface manager 200 can also incorporate XAML code for generating visuals that are running outside of a process such as component applications and top level applications.

In some embodiments, the user interface control root visual 206 can also include other chrome 208, which can include a desktop background 210 and a taskbar 212. A taskbar, as referred to herein, can include a link to a digital assistant, a task view illustrating open applications, a set of icons corresponding to applications being executed, and various icons corresponding to applications and hardware features that are enabled each time a device receives power. The desktop background can include any suitable image, any number of links or shortcuts to locally stored files, links to directories, and the like.

In one example, a user interface manager 200 can configure a view set container (also referred to herein as a user interface container) 214 based on a list of applications 216 being executed on a system. The list of applications 216 can indicate a number of applications for which application windows may be generated. The view set container 214 can be configured based in part on a set of layout rules indicating how to arrange the application windows and display characteristics indicating how each application window is to be viewed. In some embodiments, the view set container 214 can also be configured based on a state of the system. In FIG. 2, there are four user applications windows 218, 220, 222, and 224. Each application window 218, 220, 222, and 224 in the list can include window chrome 226, 228, 230, 232, and window content 234, 236, 238, and 240. Window chrome, as referred to herein, can include any suitable frame settings or adornment settings. A frame setting can indicate a window to display proximate a user application, a title bar, and an icon to identify the user application. The frame setting can be the same for each application that is visible, or each application can have different frame settings. An adornment is a control or status area that is attached to an edge of a pane or window such as a toolbar or ruler. In some embodiments, the adornments can include a drop shadow on a top level visual of a user application. In some embodiments, the window chrome 226, 228, 230, 232 can include border and shadow settings for an application window, a title bar, and the like. The window content frames can include an application bar to support browser plug-ins such as Silverlight©, a loading or resuming splash function to indicate an application is loading or resuming, and a wait cursor function that modifies a cursor when an application is executing an instruction.

In some embodiments, the window chrome can be combined with window content to produce the user application windows 218, 220, 222, and 224. The user applications windows 218, 220, 222, and 224 can be arranged in a layout according to display characteristics indicated by the user interface container manager. For example, the user interface container manager 200 can indicate if user application 218 and user application 220, among others, can be overlapped, viewed side by side, resized, and the like. In some embodiments, the user interface container 214 can be built using frameworks such as an extensible application markup language (XAML), Silverlight, Splash, or legacy win32 frameworks.

In some embodiments, the user interface manager 200 can implement a specific user interface (also referred to herein as a shell) experience by composing different components of the shell together in a way that reflects the shell experience. In some embodiments, the user interface manager 200 can communicate with an underlying shell or user interface through a set of private application programming interfaces (APIs). These private APIs can allow the user interface manager to execute instructions corresponding to shell tasks associated with a shell. The shell task can include application activation and lifetime management, application or process locks, application resizing, application visibility changes, shutdown, and other shell features. In some embodiments, the user interface manager 200 can also reflect a current state of a shell. The state of a shell can include the active view, running applications, current screen resolution and other shell state information.

In some embodiments, the user interface manager 200 can present the visuals of user applications to the user. These applications can paint into a buffer (represented by a DCOMP visual) using the framework of the application's choice. In some examples, the buffer does not paint to screen directly and by default does not get on screen by itself. Rather, the user interface manager 200 can select the visuals for an application and display the application. In some embodiments, the user interface manager 200 can also indicate any per application window content such as Splash screens, among others.

It is to be understood that the block diagram of FIG. 2 is not intended to indicate that the user interface manager 200 is to include all of the components shown in FIG. 2. Rather, the user interface manager 200 can include fewer or additional components not illustrated in FIG. 2 (e.g., additional applications, additional modules, etc.).

Figure 3:
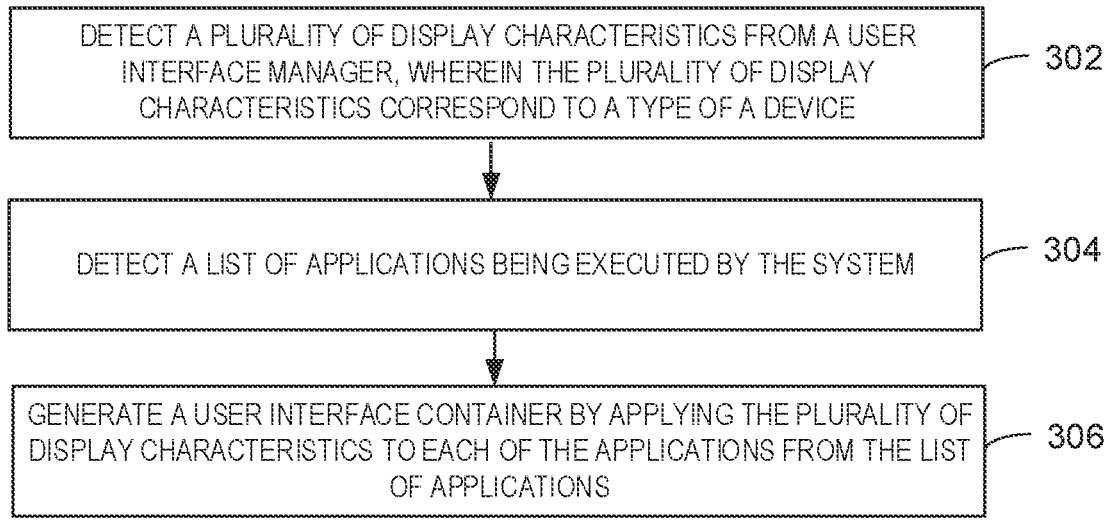
FIG. 3 is a process flow diagram of an example method for generating a user interface container.

FIG. 3 is a process flow diagram of an example method for generating a user interface container. The method 300 can be implemented with any suitable computing device, such as the computing system 102 of FIG. 1.

At block 302, a display detector 142 can detect a plurality of display characteristics from a user interface manager, wherein the plurality of display characteristics correspond to a type of a device. In some examples, the plurality of display characteristics can include layout rules and window chrome or application window rules. The layout rules can indicate how to arrange applications within a user interface. For example, the layout rules can indicate if application windows can be displayed side by side, in a full screen setting, or using an overlapping technique. The window chrome, as discussed above, can indicate frame settings and adornment settings that can include a full size icon, a minimize option, and a close option, among others. In some embodiments, the frame and adornment settings can indicate if a frame is to be a glass window frame or transparent frame, a hidden frame, or a custom frame, among others. The window chrome can also include any suitable title of the user application and icons corresponding to the user application, as well as indicators for security such as enterprise data protection (EDP). The window chrome can also include a drop shadow. In some embodiments, a glass pane or grab handle can be displayed in user interface containers for augmented reality devices. In some embodiments, a gaming console device may not have a frame or adornment around a user application window. In some embodiments, a gaming console device can display a gripper control that enables simultaneously resizing two user applications to be viewable side by side. The display characteristics can also indicate occluded elements that may be occluding an application's content and a frame position between each application window and an edge of a screen.

At block 304, an application detector 144 can detect a list of applications being executed by the system. The list of applications can include potential application windows to be included in a user interface.

At block 306, a user interface container generator 146 can generate a user interface container by applying the plurality of display characteristics to each of the applications from the list of applications. In some embodiments, the display characteristics can include layout rules that can indicate how to display applications being executed, an application launcher, a task bar, and a window list, among others. An application launcher, as referred to herein, can include a list of executable applications installed on a system, a list of recently accessed applications installed on the system, recommended applications to be installed on the system, and the like. In some examples, the application launcher can include commands that can access programs, documents, and settings. These commands can include a search function based on locally stored applications and files, a list of documents available locally on a device or on a remote server, a control panel to configure components of a device, power function commands to alter the power state of the device, and the like.

In some embodiments, the layout rules can indicate an area of a screen that is to be occupied by the application launcher, task bar, and windows corresponding to applications that are being executed. The layout rules may not rely on pixel to pixel mappings by the applications being executed. For example, user interface controls can be displayed in regions of a display screen based on the layout rules. In some examples, a text field may be displayed in the center of an application and the location of the text field can be determined by the user interface container generator 146 based on the layout rules. For example, the location of the text field may depend upon whether application windows are overlapping one another, if more than one application window is visible, and the like. The location of user interface controls can also be adjusted based on a size and location of the task bar. For example, the task bar can be displayed along the top, bottom, left side, or right side of a display screen. Each type of user interface manager can determine a location of application windows in relation to the location of the task bar. In some embodiments, the user interface container generator 146 can display the user interface based on at least one display characteristic corresponding to the user interface manager. For example, a user interface manager for gaming console devices may display applications in a full screen mode with no frame or adornments. In some embodiments, the user interface container can also display a taskbar and desktop background. A taskbar can include any number of icons corresponding to hardware control applications, executing applications, digital assistants, and the like.

Still at block 306, in some embodiments, the user application windows can be organized into various depth layers based on a locked application in the foreground and applications in the background. In some examples, each depth layer of a user interface can correspond to different user interface container with different display characteristics. In some embodiments, a user interface container corresponding to applications windows above or on top of a locked application may be limited to a single application for execution and any number of application may be included in user interface containers below or in the background of a locked application. In some embodiments, an additional user interface container can be created for an application being executed in full screen mode above or on top of other user interface containers.

In some embodiments, window chrome can be copied from a first user interface container to a second user interface container. Additionally, a layout rule or policy of each user interface container can be configured independently. For example, a layout policy indicating how many applications can be executed may differ between two user interface containers. The window chrome can also specify if application windows are docked elements that may be docked around an application's content.

In one embodiment, the process flow diagram of FIG. 3 is intended to indicate that the blocks of the method 300 are to be executed in a particular order. Alternatively, in other embodiments, the blocks of the method 300 can be executed in any suitable order and any suitable number of the blocks of the method 300 can be included. Further, any number of additional blocks may be included within the method 300, depending on the specific application. In some embodiments, the plurality of display characteristics can include a three dimensional layout for the list of applications for the augmented reality device. In some embodiments, the method 300 can include detecting a user interface host and detecting the user interface manager from the user interface host based on the type of the device.

In some embodiments, the method 300 can include detecting a second user interface manager and transferring at least one of the applications comprising the plurality of display characteristics to the second user interface manager. In some embodiments, the method 300 can include detecting that the user interface manager corresponds to a first of the applications from the list of applications that resides in a background and detecting that a second user interface manager corresponds to a second of the applications from the list of applications that resides in a foreground. Additionally, the method 300 can also include transitioning between the user interface manager and the second user interface manager in response to detecting a selection of the first of the applications or the second of the applications, wherein the transition comprises generating the user interface container with a second set of display characteristics.

In some embodiments, the user interface container comprises a two dimensional image corresponding to a user interface to be displayed based on the list of the applications and the plurality of display characteristics from the user interface manager. In some embodiments, the plurality of display characteristics for the gaming console type of device indicate no adornment for a full screen display of one of the applications or a resizing of at least two of the applications to enable a side by side display.

Figure 4:
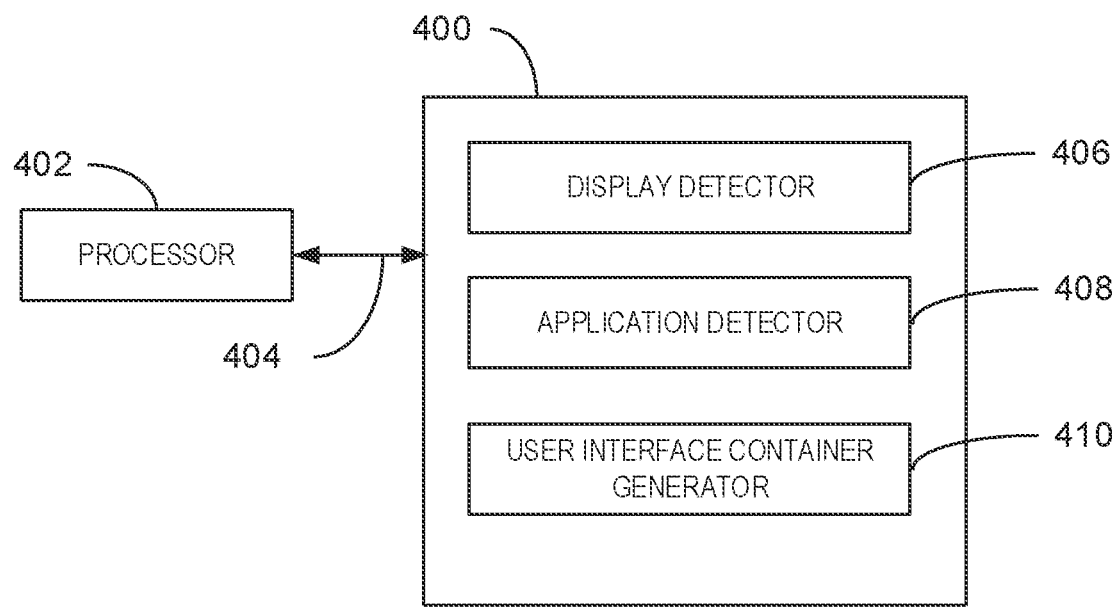
FIG. 4 is a block diagram of an example computer-readable storage media that can generate a user interface container.

FIG. 4 is a block diagram of an example computer-readable storage media that can generate a user interface container. The tangible, computer-readable storage media 400 may be accessed by a processor 402 over a computer bus 404.

Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a display detector 406 that can detect a plurality of display characteristics from a user interface manager, wherein the plurality of display characteristics correspond to a type of a device. In some embodiments, an application detector 408 can detect a list of applications being executed by the system. In some embodiments, a user interface container generator 410 can generate a user interface container by applying the plurality of display characteristics to each of the applications from the list of applications.

It is to be understood that any number of additional software components not shown in FIG. 4 may be included within the tangible, computer-readable storage media 400, depending on the specific application.

Example 1

In one embodiment, a system for generating user interface containers includes a processor to detect a plurality of display characteristics from a user interface manager, wherein the plurality of display characteristics correspond to a type of a device. The processor can also detect a list of applications being executed by the system and generate a user interface container by applying the plurality of display characteristics to each of the applications from the list of applications.

Alternatively, or in addition, the type of the device comprises a tablet device, a gaming console, a desktop device, a mobile device, an augmented reality device, or a phone device. Alternatively, or in addition, the plurality of display characteristics comprises a three dimensional layout for the applications for the augmented reality device. Alternatively, or in addition, the plurality of display characteristics comprise a frame and an adornment for each of the applications. Alternatively, or in addition, the plurality of display characteristics comprise a title bar corresponding to each of the applications. Alternatively, or in addition, the processor can detect a user interface host and detect the user interface manager from the user interface host based on the type of the device. Alternatively, or in addition, the processor can detect a second user interface manager and transfer at least one of the applications comprising the plurality of display characteristics to the second user interface manager. Alternatively, or in addition, the processor can detect that the user interface manager corresponds to a first of the applications from the list of applications that resides in a background. The processor can also detect that a second user interface manager corresponds to a second of the applications from the list of applications that resides in a foreground and transition between the user interface manager and the second user interface manager in response to detecting a selection of the first of the applications or the second of the applications, wherein the transition comprises generating the user interface container with a second set of display characteristics. Alternatively, or in addition, the user interface container comprises a two dimensional image corresponding to a user interface to be displayed based on the list of the applications and the plurality of display characteristics from the user interface manager. Alternatively, or in addition, the plurality of display characteristics for the gaming console type of device indicate no adornment for a full screen display of one of the applications. Alternatively, or in addition, the plurality of display characteristics for the gaming console type of device indicate a gripper control that is to enable simultaneously resizing two of the applications to be viewable side by side.

Example 2

In another embodiment described herein, a method for generating user interface containers can include detecting a plurality of display characteristics from a user interface manager, wherein the plurality of display characteristics correspond to a type of a device. The method can also include detecting a list of applications being executed by the system. Furthermore, the method can include generating a user interface container by applying the plurality of display characteristics to each of the applications from the list of applications.

Alternatively, or in addition, the type of the device comprises a tablet device, a gaming console, a desktop device, a mobile device, an augmented reality device, or a phone device. Alternatively, or in addition, the plurality of display characteristics comprises a three dimensional layout for the applications for the augmented reality device. Alternatively, or in addition, the plurality of display characteristics comprise a frame and an adornment for each of the applications. Alternatively, or in addition, the plurality of display characteristics comprise a title bar corresponding to each of the applications. Alternatively, or in addition, the method can include detecting a user interface host and detecting the user interface manager from the user interface host based on the type of the device. Alternatively, or in addition, the method can include detecting a second user interface manager and transferring at least one of the applications comprising the plurality of display characteristics to the second user interface manager. Alternatively, or in addition, the method can include detecting that the user interface manager corresponds to a first of the applications from the list of applications that resides in a background. The method can also include detecting that a second user interface manager corresponds to a second of the applications from the list of applications that resides in a foreground and transitioning between the user interface manager and the second user interface manager in response to detecting a selection of the first of the applications or the second of the applications, wherein the transitioning comprises generating the user interface container with a second set of display characteristics. Alternatively, or in addition, the user interface container comprises a two dimensional image corresponding to a user interface to be displayed based on the list of the applications and the plurality of display characteristics from the user interface manager. Alternatively, or in addition, the plurality of display characteristics for the gaming console type of device indicate no adornment for a full screen display of one of the applications. Alternatively, or in addition, the plurality of display characteristics for the gaming console type of device indicate a gripper control that is to enable simultaneously resizing two of the applications to be viewable side by side.

Example 3

In yet another embodiment described herein, one or more computer-readable storage devices for generating user interface containers can include a plurality of instructions that, based at least on execution by a processor, cause the processor to detect a plurality of display characteristics from a user interface manager, wherein the plurality of display characteristics correspond to a type of a device. The plurality of instructions can also cause the processor to detect a list of applications being executed by the system and generate a user interface container by applying the plurality of display characteristics to each of the applications from the list of applications.

Alternatively, or in addition, the type of the device comprises a tablet device, a gaming console, a desktop device, a mobile device, an augmented reality device, or a phone device. Alternatively, or in addition, the plurality of display characteristics comprises a three dimensional layout for the applications for the augmented reality device. Alternatively, or in addition, the plurality of display characteristics comprise a frame and an adornment for each of the applications. Alternatively, or in addition, the plurality of display characteristics comprise a title bar corresponding to each of the applications. Alternatively, or in addition, the plurality of instructions can cause the processor to detect a user interface host and detect the user interface manager from the user interface host based on the type of the device. Alternatively, or in addition, the plurality of instructions can cause the processor to detect a second user interface manager and transfer at least one of the applications comprising the plurality of display characteristics to the second user interface manager. Alternatively, or in addition, the plurality of instructions can cause the processor to detect that the user interface manager corresponds to a first of the applications from the list of applications that resides in a background. The plurality of instructions can cause the processor to detect that a second user interface manager corresponds to a second of the applications from the list of applications that resides in a foreground and transition between the user interface manager and the second user interface manager in response to detecting a selection of the first of the applications or the second of the applications, wherein the transition comprises generating the user interface container with a second set of display characteristics. Alternatively, or in addition, the user interface container comprises a two dimensional image corresponding to a user interface to be displayed based on the list of the applications and the plurality of display characteristics from the user interface manager. Alternatively, or in addition, the plurality of display characteristics for the gaming console type of device indicate no adornment for a full screen display of one of the applications. Alternatively, or in addition, the plurality of display characteristics for the gaming console type of device indicate a gripper control that is to enable simultaneously resizing two of the applications to be viewable side by side.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computing device comprising:
   a processor; and
   memory storing instructions that when executed by the processor cause the computing device to perform operations to:
   detect a device type of the computing device;
   based on the detected device type, accessing, from a user interface manager, display characteristics including layout rules for the device type;
   detect a list of applications being executed by the computing device, including a first application and a second application; and
   based on the display characteristics, generating a user interface container by applying the display characteristics to the first application and the second application being executed by the computing device to generate a first application window for the first application and a second application window for the second application according to the display characteristics, wherein the first application window and the second application window are arranged according to the layout rules and wherein the layout rules indicate whether the first and second application windows are displayed: (1) side by side; (2) in a full screen setting; or (3) in an overlapping technique.

2. The computing device of claim 1, wherein the display characteristics further include window chrome settings that indicate where frames of the first and second application windows are displayed as: (1) a glass window frame; (2) a transparent frame; (3) a hidden frame; or (4) a custom frame.

3. The computing device of claim 1, wherein the layout rules indicate how to display an application launcher.

4. The computing device of claim 3, wherein the layout rules indicate an area of a screen that is to be occupied by the application launcher.

5. The computing device of claim 1, wherein the layout rules indicate how to display a task bar.

6. The computing device of claim 5, wherein the layout rules indicate an area of a screen that is to be occupied by the task bar.

7. The computing device of claim 1, wherein the type of the device comprises a tablet device, a gaming console, a desktop device, a mobile device, an augmented reality device, or a phone device.

8. The computing device of claim 1, wherein the device type is an augmented reality device, and the display characteristics comprise a three-dimensional layout for the applications for the augmented reality device.

9. A computing device comprising:
   a processor; and
   memory storing instructions that when executed by the processor cause the computing device to perform operations to:
   detect a device type of the computing device;
   based on the detected device type, access display characteristics including layout rules for the device type;
   detect a list of applications being executed by the computing device; and
   based on the display characteristics, generate a user interface container by applying the display characteristics to the applications being executed by the computing device to generate application windows according to the display characteristics, wherein the application windows are arranged according to the layout rules and wherein the layout rules indicate whether the application windows are displayed: (1) side by side; (2) in a full screen setting; or (3) in an overlapping technique.

10. The computing device of claim 9, wherein the display characteristics further include window chrome settings that indicate where frames of the application windows are displayed as: (1) a glass window frame; (2) a transparent frame; (3) a hidden frame; or (4) a custom frame.

11. The computing device of claim 9, wherein the layout rules indicate how to display an application launcher.

12. The computing device of claim 11, wherein the layout rules indicate an area of a screen that is to be occupied by the application launcher.

13. The computing device of claim 9, wherein the type of the device comprises a tablet device, a gaming console, a desktop device, a mobile device, an augmented reality device, or a phone device.

14. A method executed by a computing device, the method comprising:
    detecting a device type of the computing device;
    detecting a list of applications being executed on the computing device including a first application, residing in a foreground, and a second application, residing in a background, executing on the computing device;
    based on the detected device type and the first application, accessing, from a first user interface manager for the first application, first display characteristics including first layout rules for the device type, wherein the first layout rules indicate that application windows are displayed in an overlapping technique; and
    based on the first display characteristics, generating a first user interface container by applying the display characteristics to the first application to generate a first application window according to the first display characteristics;
    detecting a selection of the second application to bring the second application to the foreground;
    based on the selection of the second application, accessing from a second user interface manager for the second application, second display characteristics including second layout rules for the device type, wherein the second layout rules indicate that application windows are displayed in a full-screen setting; and
    based on the second display characteristics, generating a second user interface container by applying the display characteristics to the second application to generate a second application window according to the second display characteristics.

15. The method of claim 14, wherein the first layout rules indicate how to display an application launcher.

16. The method of claim 14, wherein the device type is an augmented reality device, and the first display characteristics comprise a three-dimensional layout for the first application window for the augmented reality device.

17. The method of claim 14, wherein the type of the device comprises a tablet device, a gaming console, a desktop device, a mobile device, an augmented reality device, or a phone device.

* * * * *